(12) United States Patent
Dupey et al.

(10) Patent No.: US 10,831,730 B2
(45) Date of Patent: Nov. 10, 2020

(54) DYNAMIC CLEANSE CONFIGURATIONS FOR CLOUD

(71) Applicant: SAP SE, Walldorf (DE)

(72) Inventors: Ronald Dupey, Onalaska, WI (US); Jeffrey Woody, Onalaska, WI (US); Ryan Champlin, La Crosse, WI (US)

(73) Assignee: SAP SE, Walldorf (DE)

( * ) Notice: Subject to any disclaimer, the term of this patent is extended or adjusted under 35 U.S.C. 154(b) by 1037 days.

(21) Appl. No.: 15/295,209

(22) Filed: Oct. 17, 2016

(65) Prior Publication Data

US 2018/0107692 A1 Apr. 19, 2018

(51) Int. Cl.
*G06F 16/215* (2019.01)

(52) U.S. Cl.
CPC .................. *G06F 16/215* (2019.01)

(58) Field of Classification Search
CPC .................................................. G06F 16/215
See application file for complete search history.

(56) References Cited

U.S. PATENT DOCUMENTS

| 6,728,759 B1* | 4/2004 | Na | G06Q 10/107 707/999.104 |
| 2006/0149767 A1* | 7/2006 | Kindsvogel | G06F 16/2468 |
| 2007/0055948 A1* | 3/2007 | Cui | G06F 16/367 715/863 |

* cited by examiner

*Primary Examiner* — Jay A Morrison
(74) *Attorney, Agent, or Firm* — Mintz Levin Cohn Ferris Glovsky and Popeo, P.C.

(57) ABSTRACT

A computer-implemented method, system, and computer program product are described for initiating and displaying, at a user interface, an editor adapted to generate a plurality of configuration models, receiving a selection of at least one country from a plurality of countries. The method can include retrieving a data model and reference data associated with the at least one country, populate a plurality of attributes from the data model in the user interface and populating a plurality of selectable input mappings in the user interface. The method may also include populating a plurality of selectable output mappings in the user interface and generating at least one configuration model, in response to receiving at least one selection for the input mappings and at least one selection for the output mappings.

18 Claims, 16 Drawing Sheets

| Field | English | | Spanish | | Russian | | Japanese | |
|---|---|---|---|---|---|---|---|---|
| COUNTRY | US | | MX | | RU | | JA | |
| NAME01 | First name | 204 | First given name | 214 | First name | 224 | Given name | 234 |
| NAME02 | Nickname | 210 | Second given name | 216 | Last name | 226 | Given name furigana | 236 |
| NAME03 | Middle name | 206 | Paternal family name | 218 | Patronymic | 228 | Family name | 238 |
| NAME04 | Last name | 208 | Maternal family name | 220 | (unused) | 230 | Family name furigana | 240 |
| NAME05 | (unused) | 212 | (unused) | 222 | (unused) | 232 | (unused) | 242 |

| Field | | United States | 302 | United Kingdom | 304 | India | 306 |
|---|---|---|---|---|---|---|---|
| COUNTRY | | US | | GB | | IN | |
| SUPPL1 | 318 | (unused) | | Building name | | Point of reference | |
| SUPPL2 | 320 | (unused) | | Thoroughfare name | | Building name | |
| STREET | 312 | Street name | | Street name | | Street name | |
| NUMBER | 314 | House number | | House number | | House number | |
| UNIT | 316 | Apartment number | | Flat number | | Unit number | |
| SUPPL3 | 322 | PO Box | | PO Box | | Area name | |
| SUPPL4 | 324 | (unused) | | County | | District | |
| CITY | 308 | City | | City | | City | |
| SUBCITY | 328 | (unused) | | Subcity | | Subcity | |
| REGION | 326 | State | | Region | | State | |
| POSTCODE | 310 | Zip code | | Postal code | | PIN code | |

FIG. 3A

| | Data Quality Configurations | | | | | | |
|---|---|---|---|---|---|---|---|
| Country 402 | Edit Configuration - Example | | | | | | |
| Search | My Input Model | | | | My Output Model | | |
| | Model Field Name | | Service Field Name | Actions | Service Field Name | Model Field Name | Actions |
| Default | COUNTRY | maps to → | Country | ✦✧ | Country Code | populates → COUNTRY | ✦✧ |
| GermanyAustriaSwitzerland(3) | SUPPL1 | maps to → | | ✦✧ | | populates → SUPPL1 | ✦✧ |
| France | SUPPL2 | maps to → | | ✦✧ | | populates → SUPPL2 | ✦✧ |
| UnitedKingdom | STREET | maps to → | Street | ✦✧ | Street Name | populates → STREET | ✦✧ |
| SpainPortugal(2) | NUMBER | maps to → | House Number | ✦✧ | Street Number | populates → NUMBER | ✦✧ |
| India | UNIT | maps to → | House Number | ✦✧ | Secondary Address | populates → UNIT | ✦✧ |
| ChinaJapanKorea(3) | SUPPL3 | maps to → | | ✦✧ | | populates → SUPPL3 | ✦✧ |
| UnitedStatesCanada(2) | SUPPL4 | maps to → | Locality | ✦✧ | | populates → SUPPL4 | ✦✧ |
| Mexico | CITY | maps to → | Locality | ✦✧ | City | populates → CITY | ✦✧ |
| Brazil | SUBCITY | maps to → | Region | ✦✧ | Subcity | populates → SUBCITY | ✦✧ |
| | REGION | maps to → | Postcode | ✦✧ | Region | populates → REGION | ✦✧ |
| | POSTCODE | maps to → | | ✦✧ | Postcode | populates → POSTCODE | ✦✧ |

Settings
∨ Casing
  ∨ 100 Main St
∨ Dainties
  ∨ Munchnter 100
∨ Postal Format
  ∨ Most common for each country
∨ Region Format
  ∨ Most common for each country
∨ Street Format
  ∨ Most common for each country
∨ Script Conversion
∨ Geo Assign
  ∨ Best 404     406     408     400

FIG. 4A

| Country | 402 | | |
|---|---|---|---|
| Search | 420 | | 🔍 |
| Default | 418 | ⚙ | > |
| GermanyAustriaSwiterland(3) | 414 | ⚙ | > |
| France | 410 | ⚙ | > |
| UnitedKingdom | | ⚙ | > |
| SpainPortugal(2) | | ⚙ | > |
| India | | ⚙ | > |
| ChinaJapanKorea (3) | 416 | ⚙ | > |
| UnitedStatesCanada (2) | | ⚙ | > |
| Mexico | | ⚙ | > |
| Brazil | 412 | ⚙ | > |

FIG. 4B

| My Input Model | 404 | | | |
|---|---|---|---|---|
| Model Field Name | | | Service Field Name | Actions |
| COUNTRY | 422 | maps to → | Country 446 | |
| SUPPL1 | 424 | maps to → | | |
| SUPPL2 | 426 | maps to → | | |
| STREET | 428 | maps to → | Street 448 | |
| NUMBER | 430 | maps to → | House Number 450 | |
| UNIT | 432 | maps to → | House Number 452 | |
| SUPPL3 | 434 | maps to → | | |
| SUPPL4 | 436 | maps to → | | |
| CITY | 438 | maps to → | Locality 454 | |
| SUBCITY | 440 | maps to → | Locality 456 | |
| REGION | 442 | maps to → | Region 458 | |
| POST CODE | 444 | maps to → | Postcode 460 | |

FIG. 4C

| Service Field Name | | | Model Field Name | | Actions |
|---|---|---|---|---|---|
| Country Code | 474 | populates → | COUNTRY | 462 | |
| | | populates → | SUPPL1 | 463 | |
| | | populates → | SUPPL2 | 464 | |
| Street Name | 475 | populates → | STREET | 465 | |
| Street Number | 476 | populates → | NUMBER | 466 | |
| Secondary Address | 477 | populates → | UNIT | 467 | |
| | | populates → | SUPPL3 | 468 | |
| | | populates → | SUPPL4 | 469 | |
| City | 478 | populates → | CITY | 470 | |
| Subcity | 479 | populates → | SUBCITY | 471 | |
| Region | 480 | populates → | REGION | 472 | |
| Postcode | 481 | populates → | POSTCODE | 473 | |

My Output Model 406

FIG. 4D

| My Output Model | | | |
|---|---|---|---|
| Service Field Name | | Model Field Name | Actions |
| Country Code | populates → | COUNTRY | |
| Point of Reference _484_ | populates → | SUPPL1 _482_ | |
| Building Name _485_ | populates → | SUPPL2 _483_ | |
| Street Name | populates → | STREET | |

FIG. 4E

Clone Country <u>486</u>

Clone from: | Brazil <u>487</u> |

Clone to: | Select clone destination <u>488</u> ▽ |

☑ Clone input mappings (including order)

☑ Clone output mappings (including order) <u>489</u>

☑ Clone options

Clone    Cancel

FIG. 4F

| Settings | 408 |
|---|---|
| Casing<br>∨ 100 Main St | 490 |
| Diacritics<br>∨ Munchner Str 100 | 491 |
| Postal Format<br>∨ PO Box 100 | 492 |
| Region Format<br>∨ California | 493 |
| Street Format<br>∨ 100 N Main St Ste 300 | 494 |
| Script Conversion<br>∨ X [81] | 495 |
| Geo Assign<br>∨ Best | 496 |
| Suggestion Lists<br>∨ On | 497 |

```
┌─────────────────────────────────────────┐
│ Initiate, at a user interface, execution of a software │
│ application implementing a plurality of processes, and │
│       displaying, in the user interface,       │
│     an editor adapted to generate a plurality of    │
│         configuration models         602 │
└─────────────────────────────────────────┘
                    ↓
┌─────────────────────────────────────────┐
│   Receive a selection of at least one country    │
│                          604 │
└─────────────────────────────────────────┘
                    ↓
┌─────────────────────────────────────────┐
│ Retrieve a data model and reference data associated │
│       with the at least one country      606 │
└─────────────────────────────────────────┘
                    ↓
┌─────────────────────────────────────────┐
│ Populate a plurality of attributes from the data model in │
│ the user interface and populate a plurality of selectable │
│            input mappings         608 │
└─────────────────────────────────────────┘
                    ↓
┌─────────────────────────────────────────┐
│       Populate a plurality of selectable      │
│     output mappings in the user interface     │
│                          610 │
└─────────────────────────────────────────┘
                    ↓
┌─────────────────────────────────────────┐
│ Generate at least one configuration model in response │
│   to receiving at least one selection for the input   │
│   mappings and at least one selection for the output  │
│              mappings         612 │
└─────────────────────────────────────────┘
```

FIG. 6

DYNAMIC CLEANSE CONFIGURATIONS FOR CLOUD

TECHNICAL FIELD

This description relates to generating and defining configurations for data models.

BACKGROUND

Typically, when global organizations field data related to employees, customers, vendors, or other data entity, multiple variations may exist for how attributes associated with the data are to be stored. In some implementations, these variations may be associated with locale-specific nuances in the data entities. As a result, it is common for global organizations to use a data model definition that is a superset of the available fields for all locales represented in the data to provide all definitions for each organization. When global organizations employ a data model definition that is a superset of fields in use for all locales represented in particular data, different data attributes can be stored in the same field based on which locale is represented by the data. This can make maintaining data quality a challenge.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for causing at least one processor to execute instructions recorded on a computer-readable medium, the method including initiating, at a user interface, execution of a software application implementing a plurality of processes, and displaying, in the user interface, an editor adapted to generate a plurality of configuration models; receiving a selection of at least one country from a plurality of countries. The method may also include retrieving a data model and reference data associated with the at least one country and populating a plurality of attributes from the data model in the user interface and populating a plurality of selectable input mappings in the user interface. The selectable input mappings may correspond to at least some of the attributes associated with the data model. The method may also include populating a plurality of selectable output mappings in the user interface. The output mappings may correspond to selectable instructions for mapping the plurality of attributes to a plurality of sub-attributes associated with the at least one country. The method may also include generating at least one configuration model in response to receiving at least one selection for the input mappings and at least one selection for the output mappings. The configuration model may include instructions for linking the input mappings to the output mappings and instructions for generating a plurality of cleansed attributes. Other embodiments of this aspect include corresponding computer systems, apparatus, and computer programs recorded on one or more computer storage devices, each configured to perform the actions of the methods.

Implementations may include one or more of the following features. The method further including receiving a service request to cleanse data. The service request may include at least one data record with a plurality of data fields and an indication designating the at least one country from the plurality of countries. The method may further include cleansing the entirety of the at least one data record using the at least one configuration model. Populating a plurality of selectable input mappings and generating the at least one configuration model may be automatically performed for a country other than the at least one country based on receiving a request to clone the at least one configuration model.

Implementations may also include having the software application operating in a cloud computing environment and having the input mappings and the output mappings be updated in response to receiving a selection of a country other than the at least one country. The implementation may also include selecting a predefined default configuration model for use with the at least one country in response to determining that a data model or reference data is unavailable for the at least one country. The implementation may also include output mappings that are based at least in part on determining a semantic association between at least one attribute in the user interface to at least one sub-attribute in which the semantic association is predefined in the reference data and used to match the at least one attribute to the at least one sub-attribute.

Implementations may also include receiving, from a software application executing on a cloud computing device, a service request to cleanse data. The service request may include at least one data record with a plurality of data fields and an indication designating the at least one country from the plurality of countries. The implementation may also include selecting the at least one configuration model corresponding to the at least one country, assigning a portion of the plurality of fields according to the at least one configuration model, and generating an updated data record. The updated data record may include semantic data field mappings for the portion of the plurality of data fields. The data field mappings may be performed according to the at least one configuration model and based at least in part on the designation of the at least one country. Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

According to another general aspect, a computer program product may be tangibly embodied on a computer-readable medium and may include executable code that, when executed, is configured to cause at least one data processing apparatus to perform the following operations.

The details of one or more implementations are set forth in the accompanying drawings and the description below. Other features will be apparent from the description and drawings, and from the claims.

BRIEF DESCRIPTION OF THE DRAWINGS

FIGS. 2A-2C illustrate examples of data model content.

FIGS. 3A-3C illustrate additional examples of data model content.

FIGS. 4A-4G illustrate example screenshots in a user interface for generating configuration models for cloud computing environments.

FIG. 6 is a flowchart illustrating a process of example operations performed in the example environment of FIG. 1.

Like reference symbols in the various drawings indicate like elements.

DETAILED DESCRIPTION

Figure 1:
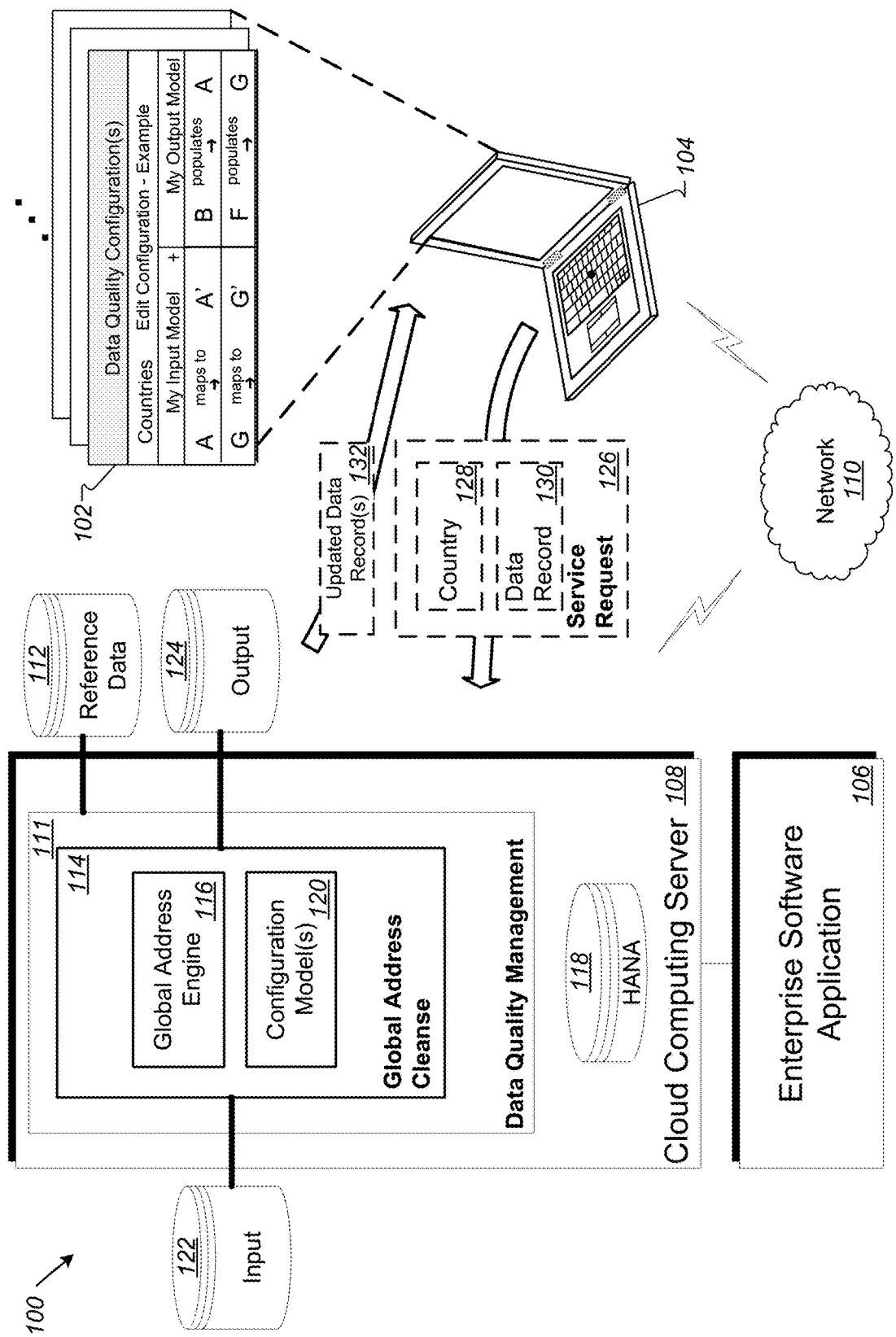
FIG. 1 is a block diagram of an example system for generating and providing data quality configuration mapping for software applications executing on a client device or in a cloud computing environment.

Businesses may enter and store name and address data in any number of different data formats. The data formats may vary depending on the software application used to access the data as well as the information and locale represented in the data. For example, name and/or address data for a first organization may be stored quite differently than name and/or address data is stored for another organization. In addition, data representing an address in Brazil may follow a different format than data representing an address in the United States. Furthermore, many of the same data fields may be used in both formats, but may be used in a different order. The existence of different languages and name nomenclatures for data sets may cause additional variations in formats used for data entry and storage. A software application may benefit from a way to configure such name and address data in an automated fashion for a number of different locales (e.g., countries, states, cities, counties, etc.). This can provide the advantage of enabling an organization to map name and address data to existing name and address data without having to be aware of data formatting and quality rules regarding the use of name and address data in an enterprise software application, for example.

The systems and methods described in this disclosure can allow for mapping a variety of different data formatting configurations to existing data based on regional, regulatory, cultural variation, or any user desired variable in name and address data structure and formatting. In particular, the systems and methods described herein can be used to map data to semantic structure to provide cleansed name and address data and attributes based one or more conditional rules associated with an identified locale. The cleansed name and address data and attributes can be properly vetted, configured, and stored in a common format while allowing each particular organization to retain an existing format for the data. This may provide the advantage of enabling organizations to maintain all existing records without having to update such records to a standardized format and thus provide the ability to use the existing records throughout multiple applications and systems.

Although the data formatting configurations may be applied to name and address data, the systems and methods can additionally apply such configurations to other data in an enterprise software application. For example, environment 100 of FIG. 1 can generate standardized or normalized data records while preserving any number of user input fields, attributes, data records, and formatting for future use by a particular organization. Thus, an organization can be provided a way to use outdated formatted data or incorrectly formatted data and file structures in a system that does not use such format or file structure because the systems described herein can generate configuration models to provide a map for structuring data such that an enterprise software application understands the data.

The systems and methods described in this disclosure can also ensure that data quality and system integrity is maintained without insisting that organizations update data usage and storage formats for name and address data. For example, organizations can configure one or more configuration models corresponding to any number of locales (e.g., countries, states, cities, counties, etc.). A cloud-based data application can match semantic data attributes in the configuration file to data attributes in a received data record. For example, each time a service request (corresponding to a data record and a selected country) is received at the cloud-based data application, the application can determine that the format does not match particular predefined features associated with a selected locale and can update the data record to match a number of semantic attributes in a configuration model. The update can be applied to the data record so that the data can be used in the application (and related applications) while maintaining the original data record data format.

The configuration models described herein may provide a way for a user to define a way to map data attributes, such as name and address attributes, in an enterprise software application. For example, a configuration model may be adapted to map a subset of data model fields to respective semantic fields. The configuration model may also be adapted to select one or more cleansed attributes for the subset of data model fields. The configuration model may also be adapted to provide data quality business rules conditional on a per locale (e.g., per country) definition of data quality. For example, the configuration model may include a number of rules for formatting and standardizing to generated cleansed attributes from a data model. In general, each rule may pertain to at least one country. Other technical advantages provided by the systems and methods described include providing map data attributes and selection of one or more cleansed attributes for a particular subset of data model fields, both conditional on a per locale (e.g., per country) definition.

FIG. 1 is a block diagram of an example environment 100 for generating and providing data quality configuration mapping for software applications executing on a client device or in a cloud computing environment. The environment 100 may be configured to provide any number of user interfaces 102 associated with software executing at a client device 104 or executing in a cloud computing environment. The client device 104 can display one or more user interfaces 102, which may be provided by an enterprise software application 106 and/or cloud computing server 108, each executing as one or more server devices and connectable through network 110.

One example user interface 102 shown here includes a data quality management application 111 accessing or running enterprise software application 106 and/or requesting data via cloud computing server 108. The user can access user interface 102 to obtain data records regarding name and address data associated with the enterprise software application 106 and to edit and generate mapped data attributes. Textual and graphical content displayed in user interface 102 may include data associated with and retrieved from a number of datasets accessible to enterprise software application 106 and/or cloud computing server 108. In some implementations, the server 108 may represent a web server such as a Hana Cloud Platform (HCP) from SAP SE. In such an example, the user interface 102 may represent a front end of a web application deployed to a web server (e.g., server 108).

The application hosting user interface 102 may be a configuration editor that a user of environment 100 can access to map data attributes input and output. In particular, the user interface 102 can generate configuration models that define how incoming name and address data can be mapped to semantic data fields that follow predefined rules for address and/or name data in the enterprise software application 106. Such rules may be organized according to country and each configuration model can be organized according to country (or a group of countries).

In an example in which user interface 102 is a configuration editor, a user can access interface 102 to define one or more configuration models in which each country may include country-specific input mappings, output selections, and/or business rule settings. Each configuration model may define how to map input data (e.g., address or name data), select output attributes (e.g., address or name fields), and define business rule settings and default options. The configuration model may also include any number of country-specific definitions for each country, or group of countries, for which data cleansing aspects may vary.

In one example implementation, environment 100 includes one or more clients 104 that represent at least one customer installation (e.g., an on-demand or an on premise installation) or at least one user in a cloud-computing environment and one or more server systems 106 and 108. Clients 104 may be communicably coupled with server systems 106 and 108. In some implementations, one or more clients 104 may co-reside on a single server or system.

As shown in FIG. 1, the server 108 includes a data quality management application 111. The data quality management application 111 may be configured to analyze, cleanse, and match customer, supplier, product, or material data (structured or unstructured) to ensure accurate and complete information is provided. In particular, the data quality management application 111 can correct components of name and address data and/or fields and attributes associated with such data. In addition, the data quality management application 111 can validate name and address data based on reference data sources, and can also format name and address data according to which country or countries correspond to the name or address data. The data quality management application 111 can provide the advantage of avoiding duplicate entities and can also help in searching and improving existing data in server 106 and/or 108.

The data quality management application 111 includes a global address cleanse service 114. Global address cleanse service 114 can receive an input (e.g., name or address data) and can match either or both using any number of matching engines available. For example, a global address engine 116 may be used to properly match address data for environment 100. The global address engine 116 may access reference data 112 to verify proper formatting, field entries, and/or attributes. The global address engine 116 can use internal knowledge (e.g., reference data 112, HANA data 118 or other data source) to determine how address lines should be cleansed, normalized, and/or corrected. Any number of errors can be corrected including but not limited to typographical errors, grammatical errors, country-specific errors, and formatting errors for any of the entered address or name data.

Configuration models 120 can be generated using user interface 102. Each configuration model may pertain to a specific country or list of countries. For example, in the country-specific definition for the United Kingdom, an address "SUPPL1" attribute is input mapped to a building name, as shown in the code snippet below.

```
{
    "model": "SUPPL1,"
    "service": "building"
}
```

In the country-specific definition for India, the same "SUPPL1" attribute is input mapped to the point of reference, as shown in the code snippet below.

```
{
    "model": "SUPPL1,"
    "service": "point_of_reference"
}
```

In the default definition and the country-specific definition for the United States (available in reference data 112, for example), the "SUPP1" attribute does not exist in the input mapping section because this attribute is unused.

In operation of environment 100, a user can access user interface 102 to generate a configuration model 120 for a particular country. The configuration model may include model field names associated with the user input and service field names associated with known good and country-specific address and name formatting. The user can provide input 122 in the form of field names and can select which field name applies to which service field name using reference data 112, HANA data 118, or other external data source. The global address cleanse service 114 can match known good service field names to the user's input model field names and provide output 124 in the form of mapping data and rules associated with the data.

Referring again to FIG. 1, the cloud computing server 108 also includes (or has access to) enterprise software application 106. The enterprise software application 106 represents computer software used to satisfy the needs of a business organization. Enterprise software application 106 generally includes a collection of computer programs (i.e., software applications and repositories) with common business applications, tools for modeling how an organization functions, and development tools for building applications unique to the organization. The enterprise software application 106 can be used in combination with server 108 to improve enterprise productivity and efficiency by providing data quality configuration generation and usage.

Services provided by the enterprise software application 106 may include business-oriented tools such as data model configuration management and data quality cleansing and management. Other services are possible including, but not limited to online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The server 108 in environment 100 can be communicatively coupled to device 104. Device 104 can access server 108 and any associated software applications. Device 104 can be connected (wired or wirelessly) to system 106 and/or 108, which can provide business data, user interfaces, and other data for use and display. In some implementations, the client computing device 104 can execute one or more applications on the server 108 as a web application, for example.

At least some of the communications between the client 104 and servers 106 or 108 may be performed across or via network 110 (e.g., the Internet). In some implementations, environment 100 may represent an example configuration of a system for establishing networks using networked applications built on a shared platform in a cloud computing environment. The client 104 and/or the servers 106 and 108 may be configured with development technology and hosted and managed services and applications built on top of an underlying platform technology. In one non-limiting example, the term "platform technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "platform technology" is understood as an Enterprise Resource Planning (ERP) technology or in-memory database such as High Performance Analytic Appliance (HANA) platform.

In some implementations, any number of content servers and one or more computer-readable storage devices can communicate with the computing devices 104, 106, and 108 using network 110 to provide data content to client devices associated with environment 100. In some implementations, the network 110 can be a public communications network (e.g., the Internet, cellular data network, dialup modems over a telephone network) or a private communications network (e.g., private LAN, leased lines). In some implementations, the computing devices 104 and/or 108 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Example client devices may include a mobile device, an electronic tablet, a laptop, or other such electronic device that may be used to access content from server 108. Each client device can include one or more processors and one or more memory devices. The client devices can execute a client operating system and one or more client applications that can access, control, and/or display data on a display device included in each respective device. The cloud computing server 108 may represent a server device. In general, the cloud computing server 108 may include any number of repositories storing content and/or software modules that can search, generate, modify (e.g., edit), or execute configuration and quality management software and associated data including reference data 112 or other data.

In some implementations, the devices 104 and 106 can be a laptop or desktop computers, smartphones, personal digital assistants, portable media players, tablet computers, gaming devices, or other appropriate computing devices that can communicate, using the network 110, with other computing devices or computer systems. Additional devices are possible and such devices may be configured to be substituted for one another.

In a non-limiting example of the operation of environment 100, a service request 126 may be received at server 108 from client 104. The service request 126 may include a country selection 128 and at least one data record 130. When the request is sent, the service sending the request may identify the country and may select at least one definition from the configuration models 120 for that country 128. If a country-specific definition (and configuration model 120) exists for a particular country, then the server 108 selects that definition. If a country-specific definition does not exist for the country, then it selects a default definition (and configuration model). The server 108 may use the definitions, the data record, and the configuration model 120 to assemble a cleansing configuration for the data record. Such a cleansing configuration may contain input fields and what semantic attribute(s) each is mapped to, output fields and what cleansed attribute to populate for each, as well as rules for formatting and standardizing the data. The cleansing configuration can be applied to the data record 130 to generate an updated data record 132. The updated data record 132 can be used throughout environment 100. The original data record 130 can be retained and maintained at client 104 without having to update or defer to updated data record 132.

In another non-limiting example, a data record/data model may include the following attributes for storing shipping address data for an online store: "CNTRY, ADDR01, ADDR02, ADDR03, ADDR04 ADDR0, ADDR06, ADDR07, ADDR08, ADDR09, ADDR10, ADDR11, ADDR12." Addresses in countries that have simple address systems may only use a few of these attributes. Addresses in countries that have complex address systems may use many or all of the attributes. In addition, from country to country, the same attribute may contain different components found in addresses.

When a user living in the United States is filling out the shipping address in a checkout form of a website, for example, text boxes are filled in and selections from combo boxes are made. In generally, the combo boxes include display labels, such as "Street Address," "City," "State," and "Zip Code." The data model used by the application may store the data in a structure with attribute names of "ADDR03," "ADDR04", "ADDR07", "ADDR10", and "ADDR12." A payload with data from a United States interface may contain the following data, as shown in the code snippet below:

```
{
    "addressInput": {
        "CNTRY": "US",
        "ADDR03": "875 NORTH MICHIGAN AVENUE",
        "ADDR04": "SUITE 899",
        "ADDR07": "CHICAGO",
        "ADDR10": "ILLINOIS",
        "ADDR12": "60611"
    },
    "configurationName": "validateShippingAddress"
}
```

The request may be sent to the service referencing a configuration name. Since the data in the request is associated with a country of "US" the service uses the "United States" definition in the configuration "validateShippingAddress." That definition identifies what contents to expect in the four "ADDR**" attributes listed above.

That United States definition in the referenced configuration also defines which cleansed attributes to return in the response (e.g., updated data record 132), and how to format the data in those attributes. The response may include the following configuration, as shown in the code snippet below:

```
{
    "CNTRY": "United States",
    "ADDR03": "875 N Michigan Ave Ste 899",
    "ADDR07": "Chicago",
```

-continued

```
    "ADDR10": "IL",
    "ADDR12": "60611-1803",
}
```

The above content represents the address that is displayed back for confirmation to the user of the web application. On the website, the display names, rather than the attribute, are used. After confirmation, the updated data record 132 may be stored in an address database that is used in order fulfillment, for example.

Figure 2B:
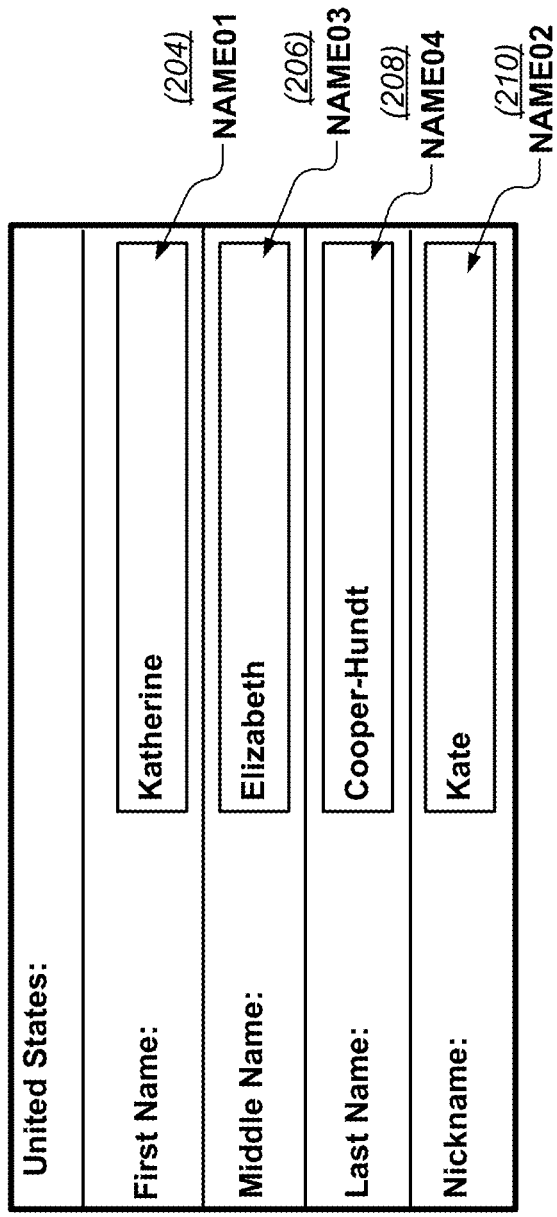
Figure 2C:
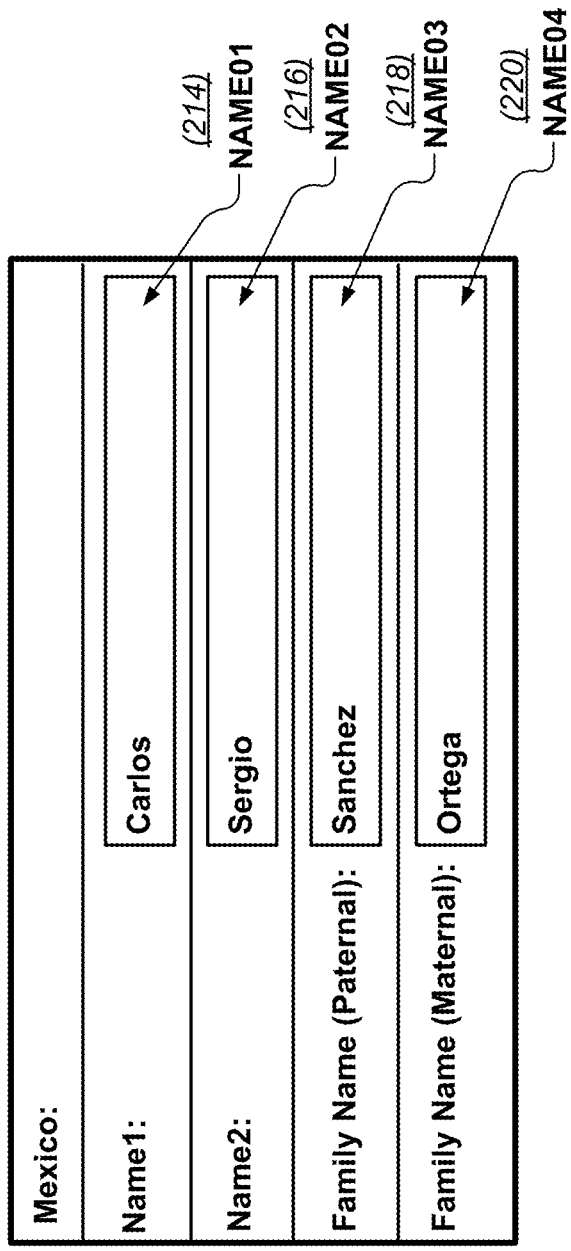

FIGS. 2A-2C illustrate examples of data model content. As shown in FIG. 2A, a table of a data model 200 with name attributes 202 that include "NAME01", "NAME02", "NAME03", "NAME04", and "NAME05."

In English countries (e.g., locales), one attribute (NAME01) 204 contains the first name, one attribute (NAME03) 206 contains the middle name, and one attribute (NAME04) 208 contains the last name. A fourth attribute (NAME02) 210 may be used to store the nickname, so that when communicating with the person, a representative of the organization knows what name the person prefers. One attribute (NAME05) 212 is unused.

In Spanish locales, one attribute 214 contains the first given name, one attribute 216 contains the second given name, and two attributes 218 and 220 contain the family name split between the paternal and maternal family names. One attribute 222 is unused.

In Russian locales, one attribute 224 contains the first name, one attribute 226 contains the last name, and one attribute 228 contains the patronymic name. Two attributes 230 and 232 are unused.

In Japanese locales, one attribute 234 contains the first name, one attribute 236 contains the last name, and two attributes 238 and 240 contain what is referred to as "furigana" which is a phonetic writing script that identifies how the person pronounces the name. One attribute 242 is unused.

As shown in FIG. 2A, the last name is stored in different data model fields depending on the locale. Only four locales are illustrated in this simple example, and there are many other variations for how the five attributes are used in various locales. In addition, the Spanish and Japanese locales, the "NAME01" and "NAME02" attributes (224/234 & 226/236) contain given name data. However, in Spanish locales the same attributes represent two different names (first name and middle name), while in Japanese locales they represent the same name (first name) represented in different writing scripts.

In one non-limiting example, a Human Resources department may provide an employee access to information stored as name data. When an employee accesses information about themselves in the organization's employee portal, both the number of fields and how the fields are populated on a display screen are variable based on the country in which the employee is located. For example, FIG. 2B shows one example of what data model fields may be queried by environment 100 and provided for display to the employee for each of the example records shown in FIG. 2A. For clarity in this disclosure, labels shown in the following examples are in English, but may be localized to the language at the locale. The "NAME01" attribute 204 shown in FIG. 2B corresponds to the first name (e.g., Katherine) for a United States locale. Similarly, the "NAME03" attribute 206 corresponds to the middle name (e.g., Elizabeth), the "NAME04" attribute 208 corresponds to the last name (e.g., Cooper-Hundt), and the "NAME02" attribute 210 corresponds to the nickname (e.g., Kate) for the Unites States locale.

As shown in FIG. 2C, the same attributes are used to store different data. In particular, for a Mexico locale, the "NAME01" attribute 214 shown in FIG. 2C corresponds to the "Name1" label (e.g., Carlos) for a Mexico locale. Similarly, the "NAME02" attribute 216 corresponds to the "Name2" label (e.g., Sergio), the "NAME03" attribute 218 corresponds to the "Paternal family name" label (e.g., Sanchez), and the "NAME04" attribute 220 corresponds to the "Maternal family name" label (e.g., Ortega) for the Mexico locale. Although not shown, the Russia and Japan locales can also use the same attributes for different types of name data.

Figure 3B:
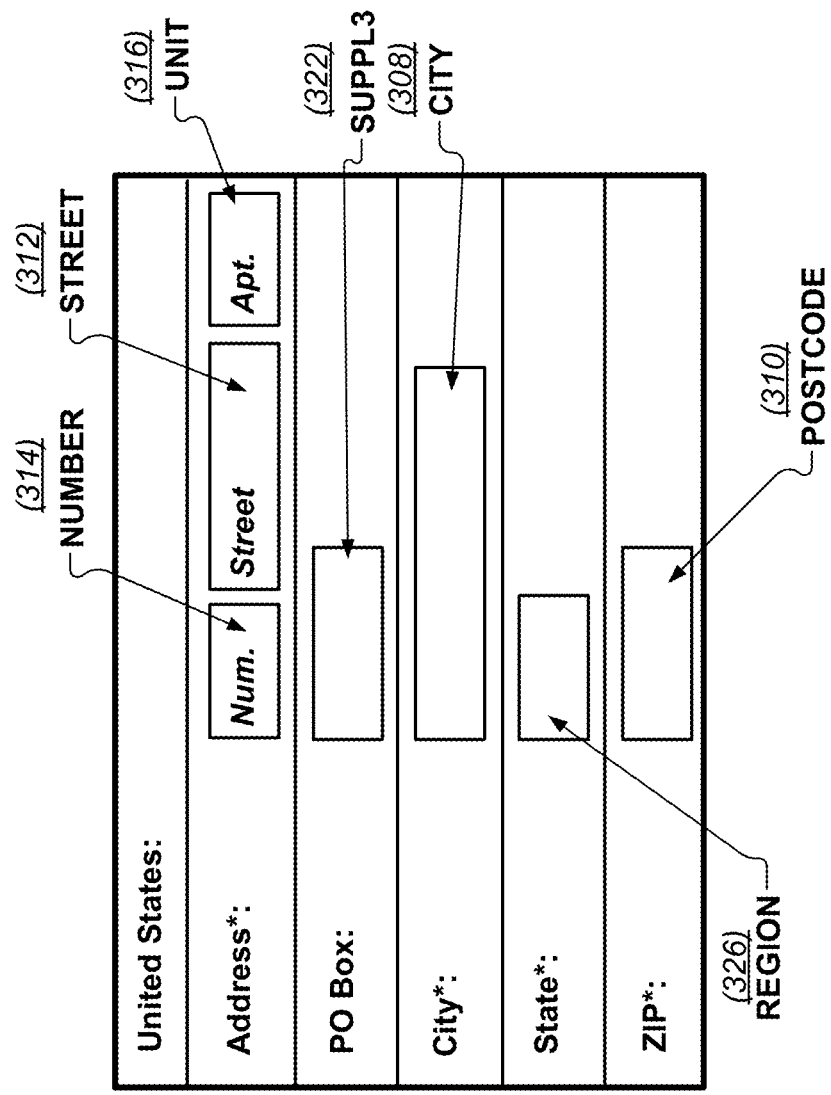
Figure 3C:
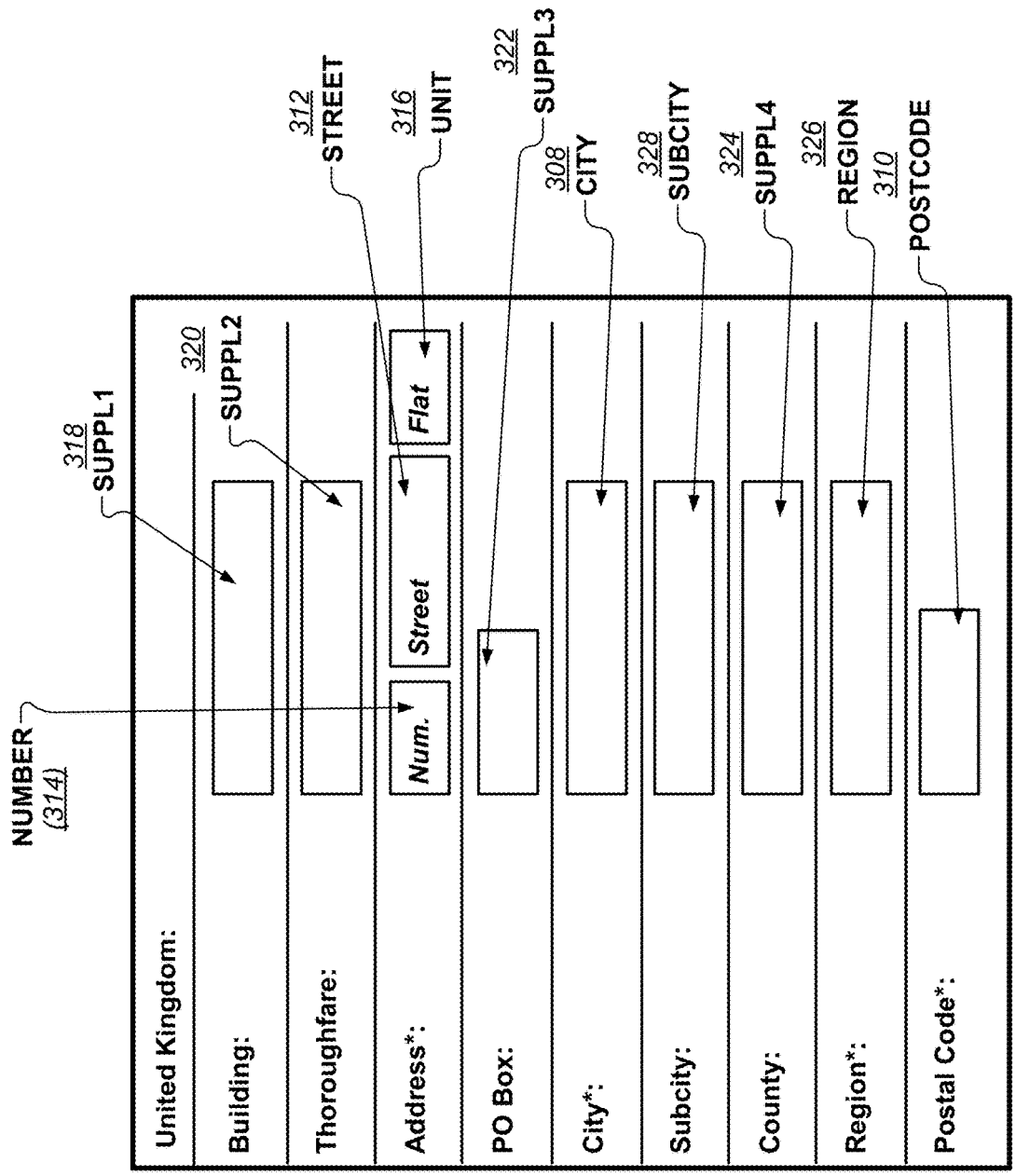

FIGS. 3A-3C illustrate additional examples of data model content. FIG. 3A depicts an example address data model 300. Storage of address data is typically more complex than storing person name data, such as name data shown in FIGS. 2A-2C above. This is the result of the many ways that governing authorities define addressing rules for different countries.

Although only three example countries are illustrated in data model 300, numerous examples for how address data is stored exist. The example countries shown include the United States 302, the United Kingdom 304, and India 306. In some attributes, such as "CITY" 308, the contents are consistent for addresses in most countries. For some attributes, such as "POSTCODE" 310, the contents contain a component that is similar throughout most countries even though it is referred to by a different name. In some attributes, such as "STREET" 312, "NUMBER" 314, and "UNIT" 316, the contents are similar when the address consists of a street address, but they are not necessarily populated because not all addresses in the world exist as a traditional street address. The contents of the supplemental attributes 318, 320, 322, and 324 vary greatly from country to country and in some countries, all four supplemental attributes 318-324 are always empty. In some countries, a variable number of the supplemental attributes are used, and the contents of each may vary based on the country (e.g., locale) of the address.

FIG. 3B shows an address record for the United States locale. Here, the street address includes a house number corresponding to a "NUMBER" attribute 314, street corresponding to "STREET" attribute 312, and sometimes a unit number corresponding to "UNIT" attribute 316. The location may include a city corresponding to "CITY" attribute 308, state corresponding to "REGION" attribute 326, and zip code corresponding to "POSTCODE" attribute 310. Sometimes an address also includes a P.O. Box instead of the street address and sometimes in addition to the street address. This optional component may be represented as a supplemental component corresponding to "SUPPL1" attribute 318. Other available supplemental attributes 320-324 remain unused.

FIG. 3C shows an address record for the United Kingdom locale. Here, the street address also includes a house number corresponding to "NUMBER" attribute 314, street corresponding to "STREET" attribute 312, and sometimes a unit number corresponding to "UNIT" attribute 316. The location includes a city corresponding to "CITY" attribute 308 and sometimes a subcity corresponding to "SUBCITY" attribute 328, region corresponding to "REGION" attribute 326, and postal code corresponding to "POSTCODE" attribute 310. There are three other supplemental components that for some addresses are required for address uniqueness in the United Kingdom, and sometimes added for the purpose of clarity. They include building name corresponding to "SUPPL1" attribute 318, thoroughfare name corresponding to "SUPPL2" attribute 320, and county corresponding to "SUPPL4" attribute 324. All four supplemental attributes 318-324 are used for UK addresses.

Although not depicted in the figures, India includes a street address with a house number, street, and sometimes a unit number. The location may include a city and sometimes a subcity, state, as described above and pin code corresponding to the "POSTCODE" attribute 310. Some addresses include a district, which for a data model for a global enterprise may be stored in a supplemental attribute because only a few countries have this component in their addresses. Similar to the United Kingdom, some addresses in India include a building name for clarity, which may be stored in a second supplemental "SUPPL2" attribute 320. Some components that are unique to addresses in India are point of reference and area name. These components can be stored in the remaining two supplemental attributes 322 and 324.

Going back to the example of employee data in a Human Resources department, an employee in the United States may access address data and be provided an example screenshot, as shown in FIG. 3B, in which both the number of fields and how the fields are populated on the screen are variable based on the country in which the employee is located. Similarly, an employee accessing address content associated with the United Kingdom may be provided an example, such as the interface shown in FIG. 3C.

FIGS. 4A-4G illustrate example screenshots in a user interface 400 for generating configuration models for cloud computing environments. The user interface 400 may be used to properly populate content and generate the examples shown in FIGS. 2A-2C and FIGS. 3A-3C above.

The user interface 400 may be used as a data and configuration editor to define at least three aspects of a data quality configuration—mapping a subset of data model fields to their respective semantic fields, selection of cleansed attributes for the subset of data model fields, and data quality business rules conditional per country and specific to each country definition. In short, user interface 400 may be used to create configuration models that define how to map input data, select output attributes, and define business rule settings by default. The user interface 400 may be similar to interface 102 (FIG. 1) and as such, may have access to hardware and software as described above with respect to FIG. 1. For example, the user interface 400 may be used to access server 106 and/or 108 to gain access to country-specific definitions for each country, or group of countries, for which any of the at least three data cleansing aspects vary.

The user interface 400 includes a country menu 402 to select and configure one or more configuration models for each country or each group of countries. For example, a user can select the United States and Canada and build a single configuration model to cover names and address attributes associated with both countries. The user interface 400 also includes an input model area 404 and an output model area 406 to generate mappings between inputs and fields and outputs and other fields. In addition, the user interface 400 includes a settings area in which to generate and configure a number of rules to apply to data accessed by users of environment 100.

As shown in FIG. 4B, the country menu 402 includes a number of selectable countries. Each country in menu 402 can be selected by a user and may be associated with a number of country-specific input mappings, output selections, or business rule settings. In the country menu 402, there may be at least one country definition for each cleanseable data record. Each definition may include rules for either one country (e.g., France 410 and Brazil 412) or a group of multiple countries (e.g., "GermanyAustriaSwitzerland" 414 and "ChinaJapanKorea" 416). The group of countries can be defined, for example, if several countries share a similar name nomenclature or address format. One example definition may be configured as a default definition 418 which can contain rules for all countries not included in a country-specific definition. Users of interface 400 can also select a search field 420 to search for country configuration models that already exist in the global address cleanse system 420.

Selecting a particular country can populate data in the input model area 404 and the output model area 406. As shown in FIG. 4C, the input model area 404 lists a number of model field names associated with a list of available data model attributes. The attributes include, but are not limited to a "COUNTRY" attribute 422, a "SUPPL1" supplemental attribute 424, a "SUPPL2" supplementary attribute 426, a "STREET" attribute 428, a "NUMBER" attribute 430, a "UNIT" attribute 432, a "SUPPL3" supplemental attribute 434, a "SUPPL4" supplementary attribute 436, a "CITY" attribute 438, a "SUBCITY" attribute 440, a "REGION" attribute 442, and a "POSTCODE" attribute 444.

The input model area also includes a number of service field names associated with semantic attributes pertaining to a data cleanse service (e.g., cleanse service 114). Each country-specific definition may include rules to map a subset of attributes from the data model that actually contain data for a particular country to the appropriate semantic attribute in the cleanse service. Attributes in the data model that are unused for the particular country are generally not mapped. The semantic attributes shown here include, but are not limited to, semantic attribute "Country" 446 corresponding to "COUNTRY" attribute 422, semantic attribute "Street" 448 corresponding to "STREET" attribute 428, semantic attribute "House Number" 450 corresponding to "NUMBER" attribute 430, semantic attribute "House Number" 452 corresponding to "UNIT" attribute 432, semantic attribute "Region" 458 corresponding to "REGION" attribute 442, and semantic attribute "Postcode" 460 corresponding to "POST CODE" attribute 444. Each country definition may include a different subset of attributes from the data model, and each attribute included may be mapped differently in different country definitions.

As shown in FIG. 4D, the output model area 406 includes a number of available data model attributes similar to the input attributes. The available attributes include, but are not limited to a "COUNTRY" attribute 462, a "SUPPL1" supplemental attribute 463, a "SUPPL2" supplementary attribute 464, a "STREET" attribute 465, a "NUMBER" attribute 466, a "UNIT" attribute 467, a "SUPPL3" supplemental attribute 468, a "SUPPL4" supplementary attribute 469, a "CITY" attribute 470, a "SUBCITY" attribute 471, a "REGION" attribute 472, and a "POSTCODE" attribute 473.

The output model area also includes a number of service field names associated with semantic attributes pertaining to the data cleanse service (e.g., cleanse service 114). Each country-specific definition may include rules to map a subset of attributes from the data model that actually contain data for a particular country to the appropriate semantic attribute in the cleanse service. Attributes in the data model that are unused for the particular country are generally not mapped. The semantic attributes shown here include, but are not limited to, semantic attribute "Country Code" 474 corresponding to "COUNTRY" attribute 462, semantic attribute "Street Name" 475 corresponding to "STREET" attribute 465, semantic attribute "Street Number" 476 corresponding to "NUMBER" attribute 466, semantic attribute "Secondary Address" 477 corresponding to "UNIT" attribute 467, semantic attribute "City" 478 corresponding to "CITY" attribute 470, semantic attribute "Subcity" 479 corresponding to "SUBCITY" attribute 471, semantic attribute "Region" 480 corresponding to "REGION" attribute 472, and semantic attribute "Postcode" 481 corresponding to "POSTCODE" attribute 473.

Each country-specific definition defines how to populate the subset of attributes from the data model that actually contain data for the particular country with the appropriate selection of cleansed attributes in the cleansing service. Attributes in the data model that are unused for the particular country do not receive data.

Each country definition may include a different subset of attributes from the data model, and each attribute included may be populated differently in different country definitions. For example, SUPPL1 attribute 463 and SUPPL2 attribute 464 are unused shown in FIG. 4D are unused. However, in FIG. 4E, an output model pertaining to India includes the "SUPPL1" attribute 482 and the "SUPPL2" attribute 484 would be populated with "Point of Reference" 484 and "Building Name" data, respectively.

As shown in FIG. 4F, a clone country option 486 can be selected by a user in user interface 400 to clone particular mappings and/or rules associated with a country. The user can quickly add a country-specific definition by adding a definition, selecting the country or group of countries and give it a name, then clone an existing country by selecting a country at box 487 and a destination at box 488. When cloning, the user may select to clone any or all of the three aspects of input mapping, output selection, and business rule settings using options 489. Accordingly, a step of populating a number of selectable input mappings and generating a configuration model may be performed automatically for a country based on receiving a request to clone a configuration model associated with another country.

As shown in FIG. 4G, the settings options 408 includes a list of configurable settings. Each country-specific definition may include different selections for the settings. This allows for a user to select to use abbreviations when formatting addresses in the United States and Canada, but to use fully spelled out words when formatting addresses in France, for example. The settings include, but are not limited to casing 490, diacritics 491, postal format 492, region format 493, street format 494, script conversion 495, geographical assignment 496, and suggestion lists 949. Settings options 408 may be retrieved from reference data 112 or other data source.

Figure 5:
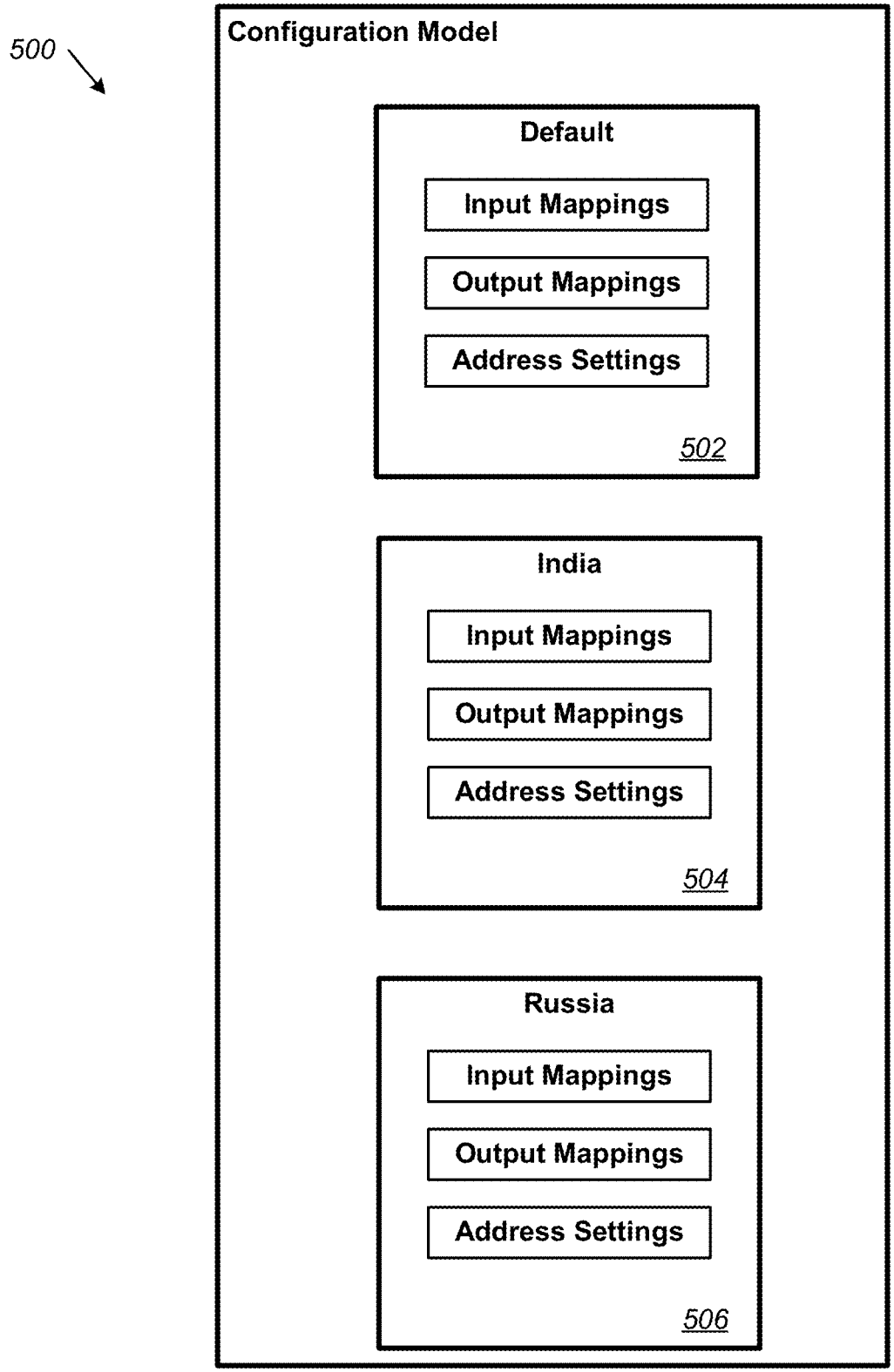
FIG. 5 is an example configuration model for use in a cloud computing environment.

FIG. 5 is an example configuration model user interface 500 for use in a cloud computing environment. The configuration model user interface 500 can include definitions for any number of locales and combinations of locales, as described in detail above. As shown in FIG. 5, a default definition 502 can contain rules for all countries not included in a country-specific definition. A default definition is typically part of all configuration models. Configuration model user interface 500 includes a definition 504 for India addresses and a defnition 506 for Russian addresses. Each definition 502-506 includes input mappings, output mappings, and address settings, as described in detail above. Each set of input mappings, output mappings, and address settings for a particular country may be configured differently for each locale. In some implementations, the differences may be minor and as such, a single configuration model can be generated for the similar countries/locales.

The following tables 1-9 include example code snippets that represent configuration model content stored in a cloud computing environment or in an on premise environment. Table 1 includes default input mappings. Table 2 includes default output mappings. Table 3 includes default address settings. Table 4 includes India input mappings. Table 5 includes India output mappings. Table 6 includes India address settings. Table 7 includes Russia input mappings. Table 8 includes Russia output mappings. Table 9 includes Russia address settings.

TABLE 1

DEFAULT Input Mappings

```
DEFAULT
"inputMappings": [                  {                              {
{                                     "model": "STR_SUPPL2",        "model": "REGION",
    "model": "STREET",                "service": "street_suppl2",   "service": "region",
    "service": "street",              "groupId": 3                  "groupId": 1
    "groupId": 3                  },                              },
},                                  {                              {
{                                     "model": "STR_SUPPL3",        "model": "POST_CODE1",
    "model":
"HOUSE_NUM1",                         "service": "street_suppl3",   "service": "postcode",
    "service": "house_num",           "groupId": 3                  "groupId": 1
    "groupId": 3                  },                              },
},                                  {                              {
{                                     "model": "LOCATION",          "model": "COUNTRY",
    "model":
"HOUSE_NUM2",                         "service": "location",        "service": "country",
    "service": "house_num2",          "groupId": 3                  "groupId": 1
    "groupId": 3                  },                              },
},                                  {                              {
{                                     "model": "CITY1",             "model": "PO_BOX",
    "model": "FLOOR",                 "service": "locality",        "service": "po_box",
    "service": "floor",               "groupId": 1                  "groupId": 3
    "groupId": 3                  },                              },
},                                  {                              {
```

TABLE 1-continued

DEFAULT Input Mappings

```
{
    "model": "ROOMNUMBER",
    "service": "roomnumber",
    "groupId": 3
},
{
    "model": "STR_SUPPL1",
    "service": "street_suppl",
    "groupId": 3
},
{
    "model": "POST_CODE2",
    "service": "po_box_postcode",
    "groupId": 3
},
{
    "model": "HOME_CITY",
    "service": "locality2",
    "groupId": 1
},
{
    "model": "CITY2",
    "service": "locality3",
    "groupId": 1
},
{
    "model": "PO_BOX_CTY",
    "service": "po_box_country",
    "groupId": 3
},
{
    "model": "PO_BOX_LOC",
    "service": "po_box_locality",
    "groupId": 3
},
{
    "model": "PO_BOX_REG",
    "service": "po_box_region",
    "groupId": 3
},
{
    "model": "PO_BOX_LOBBY",
    "service": "",
    "groupId": 0
}
],
```

TABLE 2

DEFAULT Output Mappings

```
DEFAULT outputMappings: [
{
    "model": "STREET",
    "service": "std_addr_prim_name1_4",
    "groupId": 14
},
{
    "model": "HOUSE_NUM1",
    "service": "std_addr_prim_number_full",
    "groupId": 14
},
{
    "model": "HOUSE_NUM2",
    "service": "std_addr_secaddr_no_floor_room",
    "groupId": 14
},
{
    "model": "FLOOR",
    "service": "std_addr_floor_number",
    "groupId": 14
},
{
    "model": "ROOMNUMBER",
    "service": "std_addr_room_number",
    "groupId": 14
},
{
    "model": "STR_SUPPL1",
    "service": "std_addr_building_name1_2",
    "groupId": 14
},
{
    "model": "POST_CODE2",
    "service": "std_addr_po_box_postcode_full",
    "groupId": 15
},
{
    "model": "PO_BOX_CTY",
    "service": "std_addr_po_box_country_2char",
    "groupId": 15
},
{
    "model": "PO_BOX_LOBBY",
    "service": "std_addr_po_box_delinst_full",
    "groupId": 15
},
{
    "model": "STR_SUPPL2",
    "service": "addr_remainder_extra_pmb_full",
    "groupId": 14
},
{
    "model": "STR_SUPPL3",
    "service": "std_addr_point_of_ref1_2",
    "groupId": 14
},
{
    "model": "LOCATION",
    "service": "std_addr_locality3_4_full",
    "groupId": 14
},
{
    "model": "CITY1",
    "service": "std_addr_locality_full",
    "groupId": 14
},
{
    "model": "HOME_CITY",
    "service": "std_addr_locality2_full",
    "groupId": 14
},
{
    "model": "CITY2",
    "service": "",
    "groupId": 0
},
{
    "model": "ASGMT_LEVEL_PO",
    "service": "addr_po_box_asmt_level",
    "groupId": 15
},
{
    "model": "INFO_CODE_PO",
    "service": "addr_po_box_info_code",
    "groupId": 15
},
{
    "model": "INFO_CODE_PO_MSG",
    "service": "addr_po_box_info_code_msg",
    "groupId": 15
},
{
```

TABLE 2-continued

DEFAULT Output Mappings

```
    "model": "ASGMT_LEVEL",              "model": "ASGMT_TYPE",
    "service": "addr_asmt_level",        "service": "addr_asmt_type",
    "groupId": 13                        "groupId": 13
},                                   },
{                                    {
    "model": "INFO_CODE",                "model": "ASGMT_TYPE_PO",
    "service": "addr_info_code",         "service": "addr_po_box_asmt_type",
    "groupId": 13                        "groupId": 15
},                                   },
{                                    {
    "model": "INFO_CODE_MSG",            "model": "ADDR_SUGG_COUNT",
    "service": "addr_info_code_msg",     "service": "addr_sugg_count",
    "groupId": 13                        "groupId": 17
},                                   },
{                                    {
    "model": "REGION",                   "model": "PO_BOX",
    "service": "std_addr_region_code",   "service": "std_addr_po_box_number",
    "groupId": 3                         "groupId": 15
},                                   },
{                                    {
    "model": "POST_CODE1",               "model": "PO_BOX_LOC",
                                         "service":
    "service": "std_addr_postcode_full", "std_addr_po_box_locality_full",
    "groupId": 14                        "groupId": 15
},                                   },
{                                    {
    "model": "COUNTRY",                  "model": "PO_BOX_REG",
                                         "service":
    "service": "std_addr_country_2char", "std_addr_po_box_region_code",
    "groupId": 14                        "groupId": 15
},                                   },
{                                    {
    "model": "ADDR_SUGG_LIST",           "model": "ADDR_SUGG_STATUS",
    "service": "addr_sugg_list",         "service": "addr_sugg_status",
    "groupId": 17                        "groupId": 17
},                                   },
{                                    ]
    "model": "ADDR_SUGG_ERROR",
    "service": "addr_sugg_error",
    "groupId": 17
}
```

TABLE 3

DEFAULT Address Settings

```
DEFAULT addressSettings: {              "processingMode": "both",
    "casing": "mixed",                  "geoAssign": "best"
    "diacritics": "include",        },
    "postalFormat": "countryCommonStyle",   "enableSuggestions": true,
    "regionFormat": "abbreviate",           "streetSuggestionsOnly": false,
    "streetFormat": "countryCommonStyle",   "valid": true
    "scriptConversion": "none",     },
    "suggestionSuppressLevel": "none",
```

TABLE 4

INDIA Input Mappings

```
INDIA "inputMappings":
[           {                           {
{               "model": "LOCATION",        "model": "COUNTRY",
    "model": "STREET",      "service": "location",      "service": "country",
    "service": "street",    "groupId": 3                "groupId": 1
    "groupId": 3        },                          },
},          {                           {
{               "model": "CITY1",           "model": "PO_BOX",
    "model":        "service": "locality",      "service": "po_box",
"HOUSE_NUM1",       "groupId": 1                "groupId": 3
    "service": "house_num", },                          },
    "groupId": 3        {                           {
},              "model":                    "model": "PO_BOX_LOC",
{               "HOME_CITY",
```

TABLE 4-continued

INDIA Input Mappings

```
    "model":                      "service":                    "service":
"HOUSE_NUM2",                   "locality2",                  "po_box_locality",
    "service": "house_num2",        "groupId": 1                  "groupId": 3
    "groupId": 3                },                            },
},                              {                             {
{                                   "model": "CITY2",             "model": "PO_BOX_REG",
    "model": "FLOOR",               "service": "locality3",       "service": "po_box_region",
    "service": "floor",             "groupId": 1                  "groupId": 3
    "groupId": 3                },                            },
},                              {                             {
{                                   "model": "REGION",            "model": "POST_CODE2",
    "model":                        "service": "region",          "service":
"ROOMNUMBER",                       "groupId": 1              "po_box_postcode",
    "service": "roomnumber",    },                                "groupId": 3
    "groupId": 3                {                             },
},                                  "model":
                                "POST_CODE1",                 {
{                                                                 "model": "PO_BOX_CTY",
                                                                  "service":
    "model": "STR_SUPPL1",          "service": "postcode",    "po_box_country",
    "service": "street_suppl",      "groupId": 1                  "groupId": 3
    "groupId": 3                },                            },
},                              {
                                    "model":                  {
{                               "STR_SUPPL3",                     "model":
                                    "service":                "PO_BOX_LOBBY",
    "model": "STR_SUPPL2",      "street_suppl3",                  "service": "",
    "service": "street_suppl2",     "groupId": 3                  "groupId": 0
    "groupId": 3                },                            }
},                                                            ],
```

TABLE 5

INDIA Output Mappings

```
    INDIA "outputMappings": [       {
{                                       "model": "STR_SUPPL3",
    "model": "STREET",                  "service": "std_addr_point_of_ref1_2",
    "service": "std_addr_prim_address",     "groupId": 14
    "groupId": 14               },
},                              {
{                                   "model": "LOCATION",
    "model": "HOUSE_NUM1",          "service": "std_addr_locality3_4_full",
    "service": "",                  "groupId": 14
    "groupId": 0                },
},                              {
{                                   "model": "CITY1",
    "model": "HOUSE_NUM2",          "service": "std_addr_locality_full",
    "service":                      "groupId": 14
"std_addr_secaddr_no_floor_room",
    "groupId": 14               },
},                              {
{                                   "model": "HOME_CITY",
    "model": "FLOOR",               "service": "std_addr_locality2_full",
    "service": "std_addr_floor_number",     "groupId": 14
    "groupId": 14               },
},                              {
{                                   "model": "CITY2",
    "model": "ROOMNUMBER",          "service": "std_addr_region2",
    "service": "std_addr_room_number",      "groupId": 3
    "groupId": 14               },
},                              {
{                                   "model": "REGION",
    "model": "STR_SUPPL1",          "service": "std_addr_region_code",
    "service": "std_addr_building_name1_2",     "groupId": 3
    "groupId": 14               },
},                              {
{                                   "model": "POST_CODE1",
    "model": "STR_SUPPL2",          "service": "std_addr_postcode_full",
    "service": "addr_remainder_extra_pmb_full",     "groupId": 14
    "groupId": 14               },
},                              {
{                                   "model": "ASGMT_TYPE",
    "model": "PO_BOX_LOBBY",        "service": "addr_asmt_type",
    "service": "std_addr_po_box_delinst_full",  "groupId": 13
```

TABLE 5-continued

INDIA Output Mappings

```
  "groupId": 15
},
{
  "model": "ASGMT_LEVEL",
  "service": "addr_asmt_level",
  "groupId": 13
},
{
  "model": "INFO_CODE",
  "service": "addr_info_code",
  "groupId": 13
},
{
  "model": "ADDR_SUGG_LIST",
  "service": "addr_sugg_list",
  "groupId": 17
},
{
  "model": "COUNTRY",
  "service": "std_addr_country_2char",
  "groupId": 14
},
{
  "model": "PO_BOX",
  "service": "std_addr_po_box_number",
  "groupId": 15
},
{
  "model": "PO_BOX_LOC",
  "service": "std_addr_po_box_locality_full",
  "groupId": 15
},
{
  "model": "PO_BOX_REG",
  "service": "std_addr_po_box_region_code",
  "groupId": 15
},
{
  "model": "ASGMT_LEVEL_PO",
  "service": "addr_po_box_asmt_level",
  "groupId": 15
},
{
  "model": "INFO_CODE_PO",
  "service": "addr_po_box_info_code",
  "groupId": 15
},
{
  "model": "ASGMT_TYPE_PO",
  "service": "addr_po_box_asmt_type",
  "groupId": 15
},
{
  "model": "ADDR_SUGG_COUNT",
  "service": "addr_sugg_count",
  "groupId": 17
},
{
  "model": "ADDR_SUGG_STATUS",
  "service": "addr_sugg_status",
  "groupId": 17
},
{
  "model": "POST_CODE2",
  "service": "std_addr_po_box_postcode_full",
  "groupId": 15
},
{
  "model": "PO_BOX_CTY",
  "service": "std_addr_po_box_country_2char",
  "groupId": 15
},
{
  "model": "INFO_CODE_PO_MSG",
  "service": "addr_po_box_info_code_msg",
  "groupId": 15
},
{
  "model": "INFO_CODE_MSG",
  "service": "addr_info_code_msg",
  "groupId": 13
},
{
  "model": "ADDR_SUGG_ERROR",
  "service": "addr_sugg_error",
  "groupId": 17
}
],
```

TABLE 6

INDIA Address Settings

```
INDIA "addressSettings": {
    "casing": "mixed",
    "diacritics": "include",
    "postalFormat": "countryCommonStyle",
    "regionFormat": "abbreviate",
    "streetFormat": "countryCommonStyle",
    "scriptConversion": "none",
    "suggestionSuppressLevel": "none",
    "processingMode": "both",
    "geoAssign": "best"
},
"enableSuggestions": true,
"streetSuggestionsOnly": false,
"valid": true
},
```

TABLE 7

RUSSIA Input Mappings

```
RUSSIA "inputMappings":
[
  {
    "model": "STREET",
    "service": "street",
    "groupId": 3
  },
  {
    "model": "LOCATION",
    "service": "location",
    "groupId": 3
  },
  {
    "model": "PO_BOX_LOC",
    "service": "po_box_locality",
    "groupId": 3
  },
```

TABLE 7-continued

RUSSIA Input Mappings

```
},                            {                             {
{                               "model": "CITY1",             "model": "PO_BOX_REG",
  "model": "HOUSE_NUM1",        "service": "locality",        "service": "po_box_region",
  "service": "house_num",       "groupId": 1                  "groupId": 3
  "groupId": 3                },                            },
},                            {                             {
{                               "model": "HOME_CITY",         "model": "POST_CODE2",
                                                              "service":
  "model": "HOUSE_NUM2",        "service": "locality2",      "po_box_postcode",
  "service": "house_num2",      "groupId": 1                  "groupId": 3
  "groupId": 3                },                            },
},                            {                             {
{                               "model": "CITY2",             "model": "PO_BOX_CTY",
  "model": "FLOOR",             "service": "locality3",       "service":
                                                              "po_box_country",
  "service": "floor",           "groupId": 1                  "groupId": 3
  "groupId": 3                },                            },
},                            {                             {
{                               "model": "REGION",            "model": "PO_BOX",
  "model":
"ROOMNUMBER",
  "service": "roomnumber",      "service": "region",          "service": "po_box",
  "groupId": 3                  "groupId": 1                  "groupId": 3
},                            },                            },
{                             {                             {
                                "model": "POST_CODE1",        "model": "STR_SUPPL3",
  "model": "STR_SUPPL1",        "service": "postcode",        "service": "street_suppl3",
  "service": "street_suppl",    "groupId": 1                  "groupId": 3
  "groupId": 3                },                            },
},                            {                             {
                                                              "model":
{                               "model": "COUNTRY",           "PO_BOX_LOBBY",
  "model": "STR_SUPPL2",        "service": "country",         "service": "",
  "service": "street_suppl2",   "groupId": 1                  "groupId": 0
  "groupId": 3                },                            }
},                                                          ],
```

TABLE 8

RUSSIA Output Mappings

```
    RUSSIA "outputMappings": [    {
{                                   "model": "HOME_CITY",
  "model": "STREET",                "service": "std_addr_locality2_full",
  "service": "std_addr_prim_name1_4",  "groupId": 14
  "groupId": 14
},                                },
{                                 {
  "model": "HOUSE_NUM1",            "model": "CITY2",
  "service": "std_addr_prim_number_full",   "service": "std_addr_region2",
  "groupId": 14                     "groupId": 3
},                                },
{                                 {
  "model": "HOUSE_NUM2",            "model": "REGION",
  "service":                        "service": "std_addr_region_code",
"std_addr_secaddr_no_floor_room",
  "groupId": 14                     "groupId": 3
},                                },
{                                 {
  "model": "FLOOR",                 "model": "POST_CODE1",
  "service": "std_addr_floor_number",   "service": "std_addr_postcode_full",
  "groupId": 14                     "groupId": 14
},                                },
{                                 {
  "model": "ROOMNUMBER",            "model": "COUNTRY",
  "service": "std_addr_room_number",   "service": "std_addr_country_2char",
  "groupId": 14                     "groupId": 14
},                                },
{                                 {
  "model": "STR_SUPPL1",            "model": "PO_BOX",
  "service": "std_addr_building_name1_2",   "service": "std_addr_po_box_number",
  "groupId": 14                     "groupId": 15
},                                },
{                                 {
  "model": "STR_SUPPL2",            "model": "PO_BOX_LOC",
  "service":                        "service": "std_addr_po_box_locality_full",
```

TABLE 8-continued

RUSSIA Output Mappings

```
"addr_remainder_extra_pmb_full",                    "groupId": 15
    "groupId": 14                                 },
},                                                {
{                                                     "model": "PO_BOX_REG",
    "model": "STR_SUPPL3",                            "service": "std_addr_po_box_region_code",
    "service": "std_addr_joint_of_ref1_2",            "groupId": 15
    "groupId": 14                                 },
},                                                {
{                                                     "model": "POST_CODE2",
    "model": "LOCATION",                              "service": "std_addr_po_box _postcode_full",
    "service": "std_addr_locality3_4_full",           "groupId": 15
    "groupId": 14                                 },
},                                                {
{                                                     "model": "PO_BOX_CTY",
    "model": "CITY1",                                 "service": "std_addr_po_box_country_2char",
    "service": "std_addr_locality_full",              "groupId": 15
    "groupId": 14                                 },
},                                                {
{                                                     "model": "INFO_CODE_PO",
    "model": "PO_BOX_LOBBY",                          "service": "addr_po_box_info_code",
    "service": "std_addr_po_box_delinst_full",        "groupId": 15
    "groupId": 15                                 },
},                                                {
{                                                     "model": "INFO_CODE_PO_MSG",
    "model": "ASGMT_LEVEL",                           "service": "addr_po_box_info_code_msg",
    "service": "addr_asmt_level",                     "groupId": 15
    "groupId": 13                                 },
},                                                {
{                                                     "model": "ASGMT_TYPE",
    "model": "INFO_CODE",                             "service": "addr_asmt_type",
    "service": "addr_info_code",                      "groupId": 13
    "groupId": 13                                 },
},                                                {
{                                                     "model": "ASGMT_TYPE_PO",
    "model": "INFO_CODE_MSG",                         "service": "addr_po_box_asmt_type",
    "service": "addr_info_code_msg",                  "groupId": 15
    "groupId": 13                                 },
},                                                {
{                                                     "model": "ADDR_SUGG_COUNT",
    "model": "ASGMT_LEVEL_PO",                        "service": "addr_sugg_count",
    "service": "addr_po_box_asmt_level",              "groupId": 17
    "groupId": 15                                 },
},                                                {
{                                                     "model": "ADDR_SUGG_ERROR",
    "model": "ADDR_SUGG_STATUS",                      "service": "addr_sugg_error",
    "service": "addr_sugg_status",                    "groupId": 17
    "groupId": 17                                 }
},                                                ],
{
    "model": "ADDR_SUGG_LIST",
    "service": "addr_sugg_list",
    "groupId": 17
},
```

TABLE 9

RUSSIA Address Settings

```
RUSSIA "addressSettings": {
        "casing": "mixed",
        "diacritics": "include",
        "postalFormat": "countryCommonStyle",
        "regionFormat": "abbreviate",
        "streetFormat": "countryCommonStyle",
        "scriptConversion": "none",
        "suggestionSuppressLevel": "none",
        "processingMode": "both",
        "geoAssign": "best"
    },
    "enableSuggestions": true,
    "streetSuggestionsOnly": false,
    "valid": true
    }
  ]
}
```

FIG. 6 is a flowchart illustrating a process 600 of example operations performed in the example environment of FIG. 1. Process 600 includes, at block 602, initiating, at a user interface, execution of a software application. The software application may implement any number of processes and can display, in the user interface, an editor adapted to generate configuration models. For example, server 108 can enable software application 106 to present user interface 400. In one example, the software application 106 may be an enterprise software application hosting any number of processes. The editor may be a resource for a number of users to generate configuration models to cleanse and correct name and address attributes for a number of different locales. In some implementations, the software application 106 is operating in a cloud computing environment. In some implementations, the software application 106 is operating in an on premise software program.

At block 604, the process 600 includes receiving a selection of at least one country from a plurality of countries. For example, a user can access user interface 400 and can select a country from country menu 402. The server 108 can receive the country selection and in response can retrieve a data model and reference data associated with the at selected country, at block 606. For example, the data model may be retrieved from one or more databases such as HANA data 118. The reference data can be retrieved from reference data 112 to obtain rules and verify proper formatting, field entries, and/or attributes.

At block 608, the process 600 includes populating a number of attributes from the data model in the user interface and populating a number of selectable input mappings in the user interface. For example, the server 108 can populate a number of attribute mappings in interface 400 by determining which user address data formats correspond to system address data format. The attributes may include model field names of available attributes in the system for the selected country, as shown in input model area 404. The selectable input mappings may include service field names as shown in input area 404. The selectable input mappings may correspond to at least some of the attributes associated with the data model. For example, at input model area 404, data attribute "COUNTRY" may map to customer data attribute "Country." A user can configure mappings and apply one or more actions to such attributes. In some implementations, populating the selectable input mappings and generating the configuration model can be automatically performed for a country other than the originally selected country based on receiving a request to clone a particular configuration model.

At block 610, the process 600 includes populating a number of selectable output mappings in the user interface. At a high level, the output mappings may correspond to selectable instructions for mapping the plurality of attributes to a plurality of sub-attributes associated with the at least one country. For example, the server 108 can populate attribute mappings in interface 400 by determining which system address data format to provide to a user with the data mapped in the input model area 404. In some implementations, the output mappings are based at least in part on determining a semantic association between at least one attribute in the user interface 400 to at least one sub-attribute (e.g., system generated attributes generated by server 108). The semantic association may be predefined in the reference data (e.g., reference data 112) and can be used to match attributes to sub-attributes.

In response to receiving at least one selection for the input mappings and at least one selection for the output mappings, the server 108, at block 612, generates at least one configuration model. The configuration model may include instructions for linking the input mappings to the output mappings and instructions for generating a plurality of cleansed attributes. The instructions may be formatting rules, data manipulation rules, data cleansing rules, data quality rules, or other rule applicable to the attributes described herein.

In some implementations, the input mappings and the output mappings are updated in response to receiving a selection of a country other than the at least one country. For example, if a user selects a country in interface 400, the input and output mappings may be updated based on predefined system data. A user can begin to make additional modifications to the mappings. In some implementations, the server 108 can determine that a data model or reference data is unavailable for a selected country. In response, the server 108 can then select a predefined default configuration model for use with the selected country.

In operation of environment 100, the process 600 may further include receiving a service request (from a user or system) to cleanse data. The service request may include at least one data record with a plurality of data fields and an indication designating at least one country. The server 108 can cleanse the entirety of the at least one data record using the at least one configuration model generated in the above process 600.

In some implementations, the process 600 may include receiving, from a software application executing on a cloud computing device, a service request to cleanse data. For example, cloud computing server 108 may receive a service request 126 from client 104. The service request 126 may include at least one data record 130 having a plurality of data fields and an indication designating the at least one country 128. The server 108 may use data quality management application 111 and/or global address cleanse service 114 to select at least one configuration model corresponding to the country 128 in the service request 126. The global address cleanse service 114 can assign a portion of the plurality of fields according to the at least one configuration model. For example, the configuration model may provide rules for mapping user data to system data and such rules can be used to populate forms, interfaces, or reports with appropriate name and/or address data. Next, the server 108 can generate an updated data record 132 with the mappings in the configuration model. The updated data record may include semantic data field mappings for the portion of the plurality of data fields. The data field mappings may be performed according to the at least one configuration model and based at least in part on the designation of the at least one country. The mappings can be output in the updated data records 132 for use in environment 100. Although an updated data record 132 is generated for use in the environment 100, user input fields, attributes, data records, and formatting can be preserved for future use. Thus, the user can use outdated or incorrect data formats and file structures in a system that does not use such format or file structure because the configuration model provides a map for structuring data such that the server 108 and enterprise software application 106 understands the data.

Implementations of the methods and systems described herein can include one or more computer programs can be configured to perform particular operations or actions by virtue of including instructions that, when executed by data processing apparatus, cause the apparatus to perform the actions. One general aspect includes a computer-implemented method for causing at least one processor to execute instructions recorded on a computer-readable medium, the method including initiating, at a user interface, execution of a software application implementing a plurality of processes, and displaying, in the user interface, an editor adapted to generate a plurality of configuration models; receiving a selection of at least one country from a plurality of countries. The method may also include retrieving a data model and reference data associated with the at least one country and populating a plurality of attributes from the data model in the user interface and populating a plurality of selectable input mappings in the user interface. The selectable input mappings may correspond to at least some of the attributes associated with the data model. The method may also include populating a plurality of selectable output mappings in the user interface. The output mappings may correspond to selectable instructions for mapping the plurality of attributes to a plurality of sub-attributes associated with the at least one country. The method may also include generating at least one configuration model in response to receiving at least one selection for the input mappings and at least one selection for the output mappings. The configuration model may include instructions for linking the input mappings to the output mappings and instructions for generating a plurality of cleansed attributes. Other embodiments of this aspect include corresponding computer systems, apparatus, and computer programs recorded on one or more computer storage devices, each configured to perform the actions of the methods.

Implementations may include one or more of the following features. The method further including receiving a service request to cleanse data. The service request may include at least one data record with a plurality of data fields and an indication designating the at least one country from the plurality of countries. The method may further include cleansing the entirety of the at least one data record using the at least one configuration model. Populating a plurality of selectable input mappings and generating the at least one configuration model may be automatically performed for a country other than the at least one country based on receiving a request to clone the at least one configuration model.

Implementations may also include having the software application operating in a cloud computing environment and having the input mappings and the output mappings be updated in response to receiving a selection of a country other than the at least one country. The implementation may also include selecting a predefined default configuration model for use with the at least one country in response to determining that a data model or reference data is unavailable for the at least one country. The implementation may also include output mappings that are based at least in part on determining a semantic association between at least one attribute in the user interface to at least one sub-attribute in which the semantic association is predefined in the reference data and used to match the at least one attribute to the at least one sub-attribute.

Implementations may also include receiving, from a software application executing on a cloud computing device, a service request to cleanse data. The service request may include at least one data record with a plurality of data fields and an indication designating the at least one country from the plurality of countries. The implementation may also include selecting the at least one configuration model corresponding to the at least one country, assigning a portion of the plurality of fields according to the at least one configuration model, and generating an updated data record. The updated data record may include semantic data field mappings for the portion of the plurality of data fields. The data field mappings may be performed according to the at least one configuration model and based at least in part on the designation of the at least one country. Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In general, the systems described herein may be configured to execute in a multi-layer architecture including, but not limited to a user interface layer, a services layer, a business object layer, and an application server. Data associated with one or more operational parameters may be collected from each of at least two of the layers of the computing system. Additionally, user-generated input may be received which is operable to initiate a generation of a message associated with cleansing or modifying address data on a standalone server or client, or in the cloud.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for causing at least one processor to execute instructions recorded on a computer-readable medium, the method comprising:
    initiating execution of a software application implementing a plurality of processes, and causing display, in a user interface at a client device, an editor adapted to generate a plurality of configuration models to cleanse, based on differences between countries, data records associated with one or more attributes based on differences between countries;
    receiving, from the user interface at the client device, a selection of at least one country from a plurality of countries;
    retrieving, in response to the selection of the at least one country, a data model and reference data associated with the at least one country;
    populating, in the user interface, a plurality of attributes from the data model and populating, in the user interface, a plurality of selectable input mappings, the selectable input mappings corresponding to at least some of the plurality of attributes associated with the data model;
    populating, in the user interface, a plurality of selectable output mappings, the output mappings corresponding to selectable instructions for mapping the plurality of attributes to a plurality of sub-attributes associated with the at least one country;
    in response to receiving at least one selection for the input mappings and at least one selection for the output mappings, generating at least one configuration model associated with the at least one country, the at least one configuration model including instructions for linking the input mappings to the output mappings and instructions for generating a plurality of cleansed attributes;
    receiving, from a client device, a service request to cleanse data, the service request including at least one data record having at least one of a plurality of data fields to be cleansed and an indication designating the at least one country from the plurality of countries;
    sending, to the client device, an updated data record in response to the received service request to cleanse the at least one data record having at least one of the plurality of data fields to be cleansed, the updated data record cleansed based on the mappings provided by the at least one configuration model selected based on the at least one country; and
    initiating order fulfillment based on the updated data record, rather than the data included in the service request.

2. The method of claim 1, wherein populating the plurality of selectable input mappings and generating the at least one configuration model is automatically performed for a country other than the at least one country based on receiving a request to clone the at least one configuration model.

3. The method of claim 1, wherein the software application is operating in a cloud computing environment, and wherein the input mappings and the output mappings are updated in response to receiving a selection of a country other than the at least one country.

4. The method of claim 1, in response to determining that a data model or reference data is unavailable for the at least one country, selecting a predefined default configuration model for use with the at least one country.

5. The method of claim 1, wherein the output mappings are based at least in part on determining a semantic association between at least one attribute in the user interface to at least one sub-attribute, the semantic association being predefined in the reference data and used to match the at least one attribute to the at least one sub-attribute.

6. The method of claim 1, further comprising:
    selecting the at least one configuration model corresponding to the at least one country;
    assigning the portion of the plurality of fields according to the at least one configuration model; and
    generating the updated data record, the updated data record including semantic data field mappings for the portion of the plurality of data fields, the data field mappings performed according to the at least one configuration model and based at least in part on the designation of the at least one country.

7. A system comprising:
    at least one processor; and
    at least one memory that stores instructions that, when executed by the at least one processor, cause the system to perform operations of:
    initiating execution of a software application implementing a plurality of processes, and causing display, in a user interface at a client device, an editor adapted to generate a plurality of configuration models to cleanse, based on differences between countries, data records associated with one or more attributes based on differences between countries;
    receiving, from the user interface at the client device, a selection of at least one country from a plurality of countries;
    retrieving, in response to the selection of the at least one country, a data model and reference data associated with the at least one country;
    populating, in the user interface, a plurality of attributes from the data model and populating, in the user interface, a plurality of selectable input mappings, the selectable input mappings corresponding to at least some of the plurality of attributes associated with the data model;
    populating, in the user interface, a plurality of selectable output mappings, the output mappings corresponding to selectable instructions for mapping the plurality of attributes to a plurality of sub-attributes associated with the at least one country;

in response to receiving at least one selection for the input mappings and at least one selection for the output mappings, generating at least one configuration model associated with the at least one country, the at least one configuration model including instructions for linking the input mappings to the output mappings and instructions for generating a plurality of cleansed attributes;

receiving, from a client device, a service request to cleanse data, the service request including at least one data record having at least one of a plurality of data fields to be cleansed and an indication designating the at least one country from the plurality of countries;

sending, to the client device, an updated data record in response to the received service request to cleanse the at least one data record having at least one of the plurality of data fields to be cleansed, the updated data record cleansed based on the mappings provided by the at least one configuration model selected based on the at least one country; and initiating order fulfillment based on the updated data record, rather than the data included in the service request.

8. The system of claim 7, wherein populating the plurality of selectable input mappings and generating the at least one configuration model is automatically performed for a country other than the at least one country based on receiving a request to clone the at least one configuration model.

9. The system of claim 7, wherein the software application is operating in a cloud computing environment and wherein the input mappings and the output mappings are updated in response to receiving a selection of a country other than the at least one country.

10. The system of claim 7, in response to determining that a data model or reference data is unavailable for the at least one country, selecting a predefined default configuration model for use with the at least one country.

11. The system of claim 7, wherein the output mappings are based at least in part on determining a semantic association between at least one attribute in the user interface to at least one sub-attribute, the semantic association being predefined in the reference data and used to match the at least one attribute to the at least one sub-attribute.

12. A non-transitory recordable storage medium having recorded and stored thereon instructions that, when executed, perform actions of:

initiating execution of a software application implementing a plurality of processes, and causing display, in a user interface at a client device, an editor adapted to generate a plurality of configuration models to cleanse, based on differences between countries, data records associated with one or more attributes based on differences between countries;

receiving, from the user interface at the client device, a selection of at least one country from a plurality of countries;

populating, in the user interface, a plurality of attributes from a data model and populating, in the user interface, a plurality of selectable input mappings, the selectable input mappings corresponding to at least some of the plurality of attributes associated with the data model;

populating, in the user interface, a plurality of selectable output mappings, the output mappings corresponding to selectable instructions for mapping the plurality of attributes to a plurality of sub-attributes associated with the at least one country;

in response to receiving at least one selection for the input mappings and at least one selection for the output mappings, generating at least one configuration model associated with the at least one country, the at least one configuration model including instructions for linking the input mappings to the output mappings and instructions for generating a plurality of cleansed attributes;

receiving, from a client device, a service request to cleanse data, the service request including at least one data record having at least one of a plurality of data fields to be cleansed and an indication designating the at least one country from the plurality of countries;

sending, to the client device, an updated data record in response to the received service request to cleanse the at least one data record having at least one of the plurality of data fields to be cleansed, the updated data record cleansed based on the mappings provided by the at least one configuration model selected based on the at least one country; and initiating order fulfillment based on the updated data record, rather than the data included in the service request.

13. The non-transitory recordable storage medium of claim 12, wherein the configuration model further includes a plurality of rules for formatting and standardizing the plurality of cleansed attributes from the data model, the plurality of rules corresponding to the at least one country.

14. The non-transitory recordable storage medium of claim 12, wherein populating the plurality of selectable input mappings and generating the at least one configuration model is automatically performed for a country other than the at least one country based on receiving a request to clone the at least one configuration model.

15. The non-transitory recordable storage medium of claim 12, wherein the software application is operating in a cloud computing environment, and wherein the input mappings and the output mappings are updated in response to receiving a selection of a country other than the at least one country.

16. The non-transitory recordable storage medium of claim 12, in response to determining that a data model or reference data is unavailable for the at least one country, selecting a predefined default configuration model for use with the at least one country.

17. The non-transitory recordable storage medium of claim 12, wherein the output mappings are based at least in part on determining a semantic association between at least one attribute in the user interface to at least one sub-attribute, the semantic association being predefined in reference data and used to match the at least one attribute to the at least one sub-attribute.

18. The non-transitory recordable storage medium of claim 12, further comprising:

selecting the at least one configuration model corresponding to the at least one country;

assigning the portion of the plurality of fields according to the at least one configuration model; and in response to receiving at least one selection for the input mappings and at least one selection for the output mappings, generating the updated data record, the updated data record including semantic data field mappings for the portion of the plurality of data fields, the data field mappings performed according to the at least one configuration model and based at least in part on the designation of the at least one country.

* * * * *